United States Patent [19]
Pearson

[11] Patent Number: 4,760,493
[45] Date of Patent: Jul. 26, 1988

[54] LIGHTNING PROTECTION SYSTEM FOR COMPOSITE MATERIAL AIRCRAFT STRUCTURES

[75] Inventor: Raymond E. Pearson, Redmond, Wash.

[73] Assignee: The Boeing Company, Seattle, Wash.

[21] Appl. No.: 781,753

[22] Filed: Sep. 30, 1985

[51] Int. Cl.⁴ .............................................. H05F 1/02
[52] U.S. Cl. .................................... 361/218; 244/1 A
[58] Field of Search ....................... 361/212, 218, 220; 244/1 A; 411/373, 399

[56] References Cited

U.S. PATENT DOCUMENTS

| | | | |
|---|---|---|---|
| 1,674,258 | 6/1928 | Obergfell et al. | |
| 2,366,274 | 1/1945 | Luth et al. | 13/59 |
| 2,432,986 | 12/1947 | Forman | 174/138 |
| 2,592,130 | 4/1952 | Erb et al. | 174/163 |
| 2,865,609 | 12/1958 | Steiner | 256/10 |
| 2,935,552 | 5/1960 | Forman | 174/138 |
| 2,982,494 | 5/1961 | Amason | 244/1 |
| 2,993,950 | 7/1961 | Forman | 174/138 |
| 3,086,072 | 4/1963 | Forman | 174/138 |
| 3,296,048 | 1/1967 | Wolfe | 156/97 |
| 3,416,027 | 12/1968 | Amason et al. | 315/36 |
| 3,495,494 | 2/1970 | Scott | 85/1 |
| 3,568,311 | 3/1971 | Lawton | 29/624 |
| 3,592,100 | 7/1971 | Mackiewicz | 85/1 |
| 3,620,119 | 11/1971 | King, Jr. et al. | 411/399 |
| 3,755,713 | 8/1973 | Paszkowski | 317/2 |
| 3,906,308 | 9/1975 | Amason et al. | 317/2 |
| 3,989,984 | 11/1976 | Amason et al. | 317/2 |
| 4,352,142 | 9/1982 | Olson | 361/218 |
| 4,479,163 | 10/1984 | Bannink, Jr. et al. | 361/218 |
| 4,502,092 | 2/1985 | Bannink, Jr. et al. | 361/218 |

Primary Examiner—L. T. Hix
Assistant Examiner—Brian W. Brown
Attorney, Agent, or Firm—Joan H. Pauly

[57] ABSTRACT

The conductivity of the outer surface of skin (2) is enhanced by providing an outer layer of conductive material. The outer surfaces of each external metal fastener (8) and the skin around it are covered with a patch (6) of a strongly dielectric material. Patch (6) is dimensioned to cause current flow from lightning strikes to diffuse to a current density below an arcing threshold before reaching fastener (8). Preferably, further protection against arcing between the outer surface of skin (2) and metallic fasteners and fittings is provided by coating with a dielectric any surface portions of such fasteners and fittings that contact the skin (2) or an integral continuation thereof. When load requirements permit, fasteners made from dielectric materials are used instead of dielectric coated fasteners.

5 Claims, 1 Drawing Sheet

U.S. Patent  Jul. 26, 1988  4,760,493
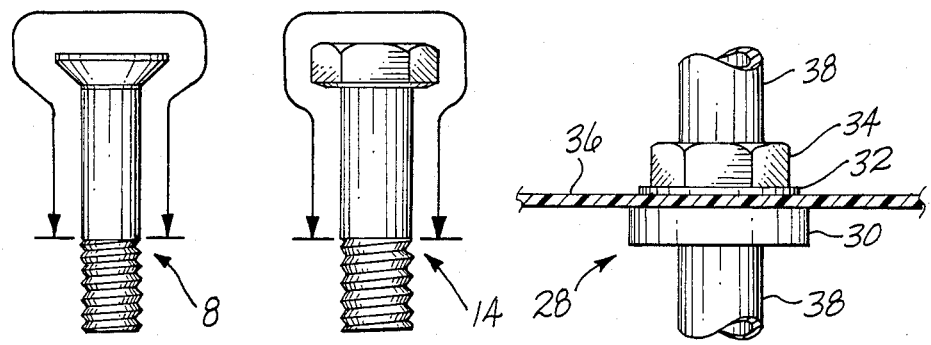
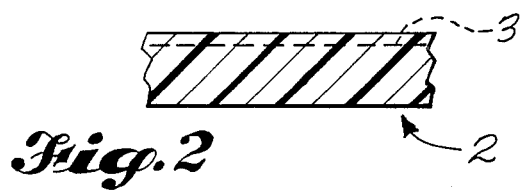
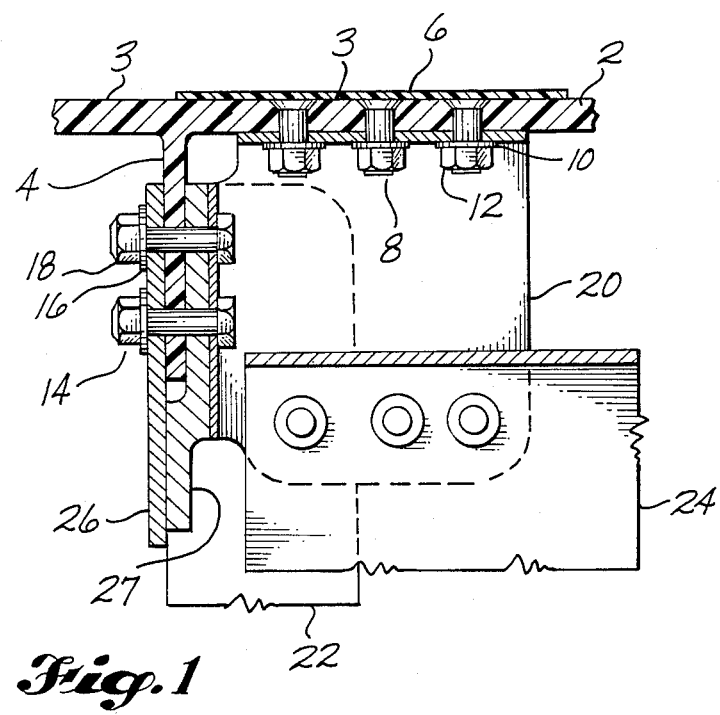

LIGHTNING PROTECTION SYSTEM FOR COMPOSITE MATERIAL AIRCRAFT STRUCTURES

TECHNICAL FIELD

This invention relates to aircraft lightning protection systems and, more particularly, to such a system that confines current from a lightning strike to an external portion of the skin and prevent arcing between such external portion of the skin and metallic fasteners and fittings.

BACKGROUND ART

The use of composite materials such as graphite fiber reinforced epoxies in the fabrication of skins and stringers in aircraft wing structures presents a number of problems in relation to providing lightning strike protection. These problems are different from the problems associated with providing lightning strike protection in conventional aluminum structures because such materials have different electrical properties from aluminum. Such materials are conductive but are considerably less conductive than metals like aluminum and so offer much more resistance to current flow than metallic structures and/or fasteners. Therefore, lightning is attracted to external metal fasteners which attempt to transfer current from a lightning strike into the composite material skin and/or substructure. This can result in internal arcing within the wing structure. Such arcing is undesirable particularly when the wing structure or adjacent cavities, such as the leading or trailing edges, contain fuel and/or combustible vapors.

Another problem is that lightning strikes on such composite material skins can cause burning through such skins. This burn-through can be partially dealt with by making the skins sufficiently thick to confine the damage to repairable surface damage. Further protection may be obtained by providing the outer surface of the skin with various coatings. There have been a number of proposals for providing aircraft structures with lightning protection by providing an outer layer or coating of conductive and/or dielectric material.

U.S. Pat. Nos. 2,982,494, granted May 2, 1961, to M. P. Amason, and 3,416,027, granted Dec. 10, 1968, to M. P. Amason et al, disclose lightning protection systems for aircraft radomes. Each such system includes metallic strips on the exterior surface of the radome for controlling the path of current resulting from a lightning strike.

U.S. Pat. Nos. 3,755,713, granted Aug. 28, 1973, to J. B. Paszkowski; 3,906,308, granted Sept. 16, 1975, to Amason et al; 3,989,984, granted Nov. 2, 1976, to Amason et al; and 4,352,142, granted Sept. 28, 1982, to G. O. Olson, each disclose means for protecting a composite material aircraft structure from lightning. Paszkowski discloses a knitted wire mesh cover over a composite material panel or aerodynamic surface to provide a conductive surface for the aircraft. Amason et al U.S. Pat. No. 3,906,308 disclose a dielectric coating over critical components of the structure. For large span components, spaced metallic strips are affixed to the dielectric outer surface to provide dwell points for the ligthning current channel. Amason et al U.S. Pat. No. 3,989,984 disclose an outer grounded perforated metal layer on the aircraft structure with a bonded dielectric layer beneath such metal layer. At joints in the skin of the structure, exterior surfaces of metallic fasteners are exposed and the conductivity of the fasteners is enhanced by providing the fasteners with suitable coatings. Olson describes a lightning protection system in which the skin of an aircraft structure has an external surface with a sandwich structure consisting of an outer layer of aluminum foil, an intermediate layer of dielectric material, and an inner layer of aluminum foil.

Lightning protection systems for composite material aircraft structures that act to confine a lightning strike to an external portion of the skin present a problem because arcing is likely to occur between the external skin and a metallic fastener or some other metallic member, even when such fastener or member is relatively remote from the initial strike area. When the structure or adjacent cavities contain fuel and/or combustible vapors, such arcing can cause highly dangerous explosions that could lead to destruction of the aircraft.

U.S. Pat. Nos. 2,366,274, granted Jan. 2, 1945, to Luth et al; 3,296,048, granted Jan. 3, 1967, to M. W. Wolfe; and 3,495,494, granted Feb. 17, 1970, to A. L. Scott, each disclose a plastic fastener. Luth et al disclose thermoplastic rivets for fastening together two pieces made from a thermoplastic material. Wolfe discloses a polyurethane screw-like plug for repairing automobile tires. Scott discloses a plastic fastener with reinforced threads. The threads are made from a resin impregnated with glass fiber filaments.

The following United States Patents each disclose a fastener having metallic portions that are electrically insulated:

U.S. Pat. No. 1,674,258, granted June 19, 1928, to H. F. Obergfell et al;

U.S. Pat. No. 2,432,986, granted Dec. 23, 1947, to B. G. Forman;

U.S. Pat. No. No. 2,592,130, granted Apr. 8, 1952, to G. H. Erb et al;

U.S. Pat. No. 2,865,609, granted Dec. 23, 1958, to T. O. Steiner;

U.S. Pat. No. 2,935,552, granted May 3, 1960, to B. G. Forman;

U.S. Pat. No. 2,993,950, granted July 25, 1961, to B. G. Forman;

U.S. Pat. No. 3,086,072 granted Apr. 16, 1963, to B. G. Forman;

U.S. Pat. No. 3,568,311, granted Mar. 9, 1971, to E. J. Lawton; and

U.S. Pat. No. 3,592,100, granted July 13, 1971, to C. Mackiewicz.

Steiner discloses an insulated fastener for electrical fences consisting of a looped wire having a hydrophobic nonconductive sleeve. The other eight patents each disclose a screw-like or bolt-like fastener having a head portion with at least some exposed metal surfaces. Mackiewicz discloses a screw with exposed metal shank and threaded portions and an insulated head. The head has a slot therethrough which exposes the base metal. The screw is designed for use with grouped electrical switches to prevent arcing between adjacent screw heads.

The above patents and the prior art that is discussed and/or cited therein should be studied for the purpose of putting the present invention into proper perspective relative to the prior art.

DISCLOSURE OF THE INVENTION

The subject of this invention is a method for providing lightning strike protection for an aircraft structure having a composite material external skin that is electrically conductive but less conductive than metals such as aluminum. According to an aspect of the invention, the method comprises enhancing the conductivity of the outer surface of the skin to confine lightning strikes to such outer surface. The method also includes covering the outer surfaces of each metal fastener that extends through the skin and a predetermined area of the outer surface of the skin surrounding such fastener with a patch of dielectric material, to prevent such fastener from attracting lightning strikes, to cause lightning strikes to be confined to portions of the outer surface of the skin not covered with a dielectric material, and to cause current flow from a lightning strike to diffuse before reaching such fastener. The area of the outer surface of the skin covered by the dielectric patch is dimensioned to be sufficiently large to cause such current flow to diffuse, before reaching such fastener, an amount sufficient to lower the current density below a predetermined arcing threshold, to in turn prevent internal arcing in the aircraft structure.

According to a preferred aspect of the invention, the method further includes electrically isolating metallic fasteners and fittings from the skin. This is done by coating with a dielectric any surface portions of such fasteners and fittings that substantially contact any portion of the skin or any portion of any integral continuation of the skin. The electrical isolation prevents arcing between an external portion of the skin and the metallic fasteners and fittings. The protection against arcing provided by the electrical isolation is in addition to and substantially redundant with the protection provided by confining lightning strikes to portions of the outer surface of the skin and diffusing current flow from such strikes.

Preferably, the method further comprises fastening other members to the skin and its integral continuations with fasteners made from dielectric materials at locations where the load on fasteners is sufficiently light to be borne by dielectric fasteners. The use of such dielectric fasteners where loading requirements permit generally reduces the overall cost of the aircraft structure and maximizes the protection against internal arcing by minimizing the presence of metallic elements.

According to another preferred aspect of the invention, the step of isolating metallic fasteners includes coating with a dielectric all head and shank portions, but not threaded portions, of metallic fasteners that extend through the skin or any integral continuation of the skin. The coated fasteners are provided with washers having dielectric external surfaces. This procedure for coating the fasteners is relatively economical and may be accomplished without sacrificing the structural strength of the fasteners.

A preferred feature of the invention is enhancing the conductivity of the outer surface of the skin by providing the skin with an outer layer that includes a conductive material, such as nickel coated graphite fibers. This outer layer is cocured with other layers of the skin to integrate it into the skin. This preferred procedure has the advantage of providing effective protection against separation of the conductive enhancement from the rest of the skin.

Aircraft structures provided with lightning strike protection in accordance with the present invention are reliably protected against any significant damage to the skin of the structure and against potentially dangerous internal arcing. The enhancing of the conductivity of the skin greatly reduces any damage to the skin due to burning of the skin at the site of a lightning strike. The covering of outer surfaces of metal fasteners extending through the skin and the outer surface of the skin surrounding such fasteners with dielectric patches, in combination with enhancing such conductivity, prevents the fasteners from attracting lightning strikes and from conducting significant current flow from such lightning strikes to the interior of the structure. This, in turn, prevents internal arcing in the aircraft structure. The internal portions of the structure are effectively shielded from the effects of a lightning strike and from damage that might be caused thereby, and explosions caused by ignition of fuel or combustible vapors due to internal arcing are effectively prevented.

The preferred feature of electrical isolation of metallic fasteners and fittings from the skin causes current from a lightning strike to flow through the outer surface portion of the skin and ignore the presence of the metallic fasteners and fittings. This confining of the current provides additional protection against internal arcing. Together, the enhanced conductivity, the dielectric patches, and the localized dielectric coatings serve to confine current from a lightning strike to an external portion of the skin and to prevent internal arcing and damage to the internal portions of the structure.

These and other advantages and features will become apparent from the detailed description of the best mode for carrying out the invention that follows.

BRIEF DESCRIPTION OF THE DRAWINGS

In the drawings, like element designations refer to like parts throughout, and:

FIG. 1 is a sectional view of a typical installation constructed in accordance with the preferred embodiment of the invention, with parts shown in elevation.

FIG. 2 is an enlarged sectional view of a portion of the skin, showing the outer conductive layer.

FIG. 3 is an elevational view of an external fastener, with arrows indicating the extent of coverage of a dielectric coating provided in accordance with the preferred embodiment of the invention.

FIG. 4 is like FIG. 3 except that it shows an internal metallic fastener.

FIG. 5 is an elevational view of a bulkhead fitting.

BEST MODE FOR CARRYING OUT THE INVENTION

The drawings show an aircraft wing structure and components thereof constructed and assembled in accordance with the preferred embodiment of the invention. The preferred embodiment illustrated in the drawings and described herein constitutes the best mode of the invention currently known to the applicant.

The wing structure illustrated in FIG. 1 includes a skin 2 made from a composite material, such as graphite fiber reinforced epoxy resin composite material, that is electrically conductive but less conductive than metals such as aluminum. The structure also includes a number of spar chords 4, one of which is shown in FIG. 1, that are made from a similarly conductive composite material, preferably the same material, as the skin 2 and that are formed as integral continuations of the skin 2. A flange of a shear clip 20 is attached to the skin 2 by means of external metal fasteners 8. The shear clip 20 may be made of fiberglass or a similar material if loading requirements permit, or may be made of metal with a dielectric coating if the load requirements are greater.

Internal fasteners 14 fasten the shear clip 20, a spar web 26, and a stiffener 27 to the spar chord 4. The portions of the web 26 and stiffener 27 that contact the spar chord 4 are either made from a dielectric material or coated with a dielectric material, depending on the structural requirements in the particular installation. The structure shown in FIG. 1 also includes a rib post 22 and a rib 24. The use and functions of members like the shear clip 20, spar web 26, stiffener 27, rib post 22, and rib 24 are well-known in the art and will not be discussed herein as such a discussion is not necessary to an understanding of the present invention.

In accordance with the invention, the conductivity of the outer surface of the skin 2 is enhanced and the outer surfaes of the external fasteners 8 and the surrounding skin 2 are provided with a dielectric covering 6 to confine lightning strikes to portions of the outer surface of skin 2 and to diffuse current from such strikes before it reaches fasteners 8. The dielectric covering 6 over the metal fasteners 8, which extend through the skin 2, prevents the fasteners 8 from conducting any significant amount of current from a lightning strike from the external surface of the wing structure to the interior of the structure. The covering 6 covers the tops of the heads of the fasteners 8 and extends outwardly from such heads along the outer surface of the skin 2 to also cover the outer surface portions of the skin 2 surrounding the fasteners 8. In the installation shown in FIG. 1, the covering 6 is preferably provided in the form of a patch of highly dielectric material, such as the material sold under the trademark Kapton by DuPont de Nemours EI & Co. The dielectric patch 6 is adhesively bonded over the fasteners 8 and the surrounding outer surface of the skin 2. Whatever the particular material used for forming the patch 6, such patch 6 is dimensioned to cover an area of the outer surface of the skin 2 that is sufficiently large to cause current flow from a lightning strike to diffuse, before reaching an external fastener 8, an amount sufficient to lower the current density below a predetermined arcing threshold. The diffusing of the current in turn prevents internal arcing in the aircraft structure. The arcing threshold is determined on the basis of the nature and proximity of the materials inside the structure.

The skin 2 is preferably at least 0.15 inch thick to prevent more than repairable surface damage to the skin 2 resulting from burning of the skin 2 caused by lightning strikes. Lightning strike tests using the FAA 25, defined Zone 2, swept stroke have shown that skin thicknesses of 0.15 inch or greater are adequate to prevent burn-through and confine damage to the skin to repairable surface damage. The degree of such surface damage is significantly reduced by the conductive enhancement of the outer surface of the skin 2.

The conductive enhancement may be provided in a number of forms. One such form is an outer layer 3 of material that is laid up with the other layers of the skin 2 and cocured with such other layers to become an integral structural part of the skin 2. Such a layer 3 is illustrated in FIG. 2. Examples of materials suitable for forming layer 3 are the material manufactured by the Fibrite Corporation and sold under the name Graphite/Epoxy Fabric/BMS 8-212 Type 3 Class 2 Style Epoxy PrePreg 3H-135-8H GREP, and the aluminum coated E-Glass sold under the trademark Thorstrand by the Hexcel Corporation. The former material may be provided with interwoven aluminum wire or with nickel coated graphite fibers. Another form in which the conductive enhancement may be provided is an aluminum and/or nickel flame spray on the exterior surface of the skin 2.

The enhanced conductivity of the outer surface of the skin 2 and the dielectric coverings 6 on areas that include metallic external fasteners prevent the external fasteners 8 from attracting lightning strikes, confine lightning strikes to portions of the outer surface of the skin 2 not covered with a dielectric material, and cause current flow from a lightning strike to diffuse before reaching an external fastener 8 to prevent internal arcing. The protection against arcing provided by the enhanced conductivity and coverings 6 is effective, but the potentially disastrous consequences of internal arcing make it desirable to provide additional protection. In an unprotected or an inadequately protected aircraft structure, the presence of metallic fasteners and fittings, even in locations relatively remote from the initial lightning strike, can cause arcing to occur between the external portion of the skin 2 and such metallic fasteners and fittings. Therefore, in accordance with the invention, such metallic fasteners and fittings are preferably electrically isolated from the external portion of the skin 2 to prevent such arcing. The electrical isolation is accomplished by providing a highly dielectric coating on any surface portions of such fasteners or fittings that contact or substantially contact any portion of the skin 2 or any portion of any integral continuation of the skin 2. In the installation shown in FIG. 1, the stringer 4 is such an integral continuation.

The protection against arcing provided by the enhanced conductivity and the dielectric coverings 6 and the protection against arcing provided by the electrical isolation of metallic fasteners and fittings are preferably redundant. If there is any kind of failure in either of the types of protection, the other type is designed to prevent internal arcing by itself. For example, if a dielectric coating has a chip because of rough handling during assembly, the diffusing of the current will prevent internal arcing.

In the preferred embodiment of the invention, metallic fasteners with dielectric coatings are only provided at locations where there are relatively high load requirements on the fasteners which are too great to be borne by fasteners made entirely from dielectric materials. At locations where the load on fasteners is sufficiently light to be borne by fasteners made entirely from dielectric materials, it is preferable that such entirely dielectric fasteners be used. This reduces the overall cost of the structure and minimizes the number of locations at which there is any possibility of contact between a metallic portion of a fastener and the skin 2 or an integral continuation thereof. The external fasteners 8 shown in the drawings are metallic with a dielectric coating on each surface that contacts the skin 2, but when load requirements permit, entirely dielectric external fasteners are preferably used. Internal fasteners, like the fasteners 14 shown in the drawings, are either dielectric coated or made from a dielectric material depending on the load requirement at a specific location.

When lightning strikes the outer surface of a composite material skin, a high voltage drop develops between the location of the lightning strike and the interface of the skin or an integral continuation thereof with a metallic fastener or fitting. This voltage drop is a result of the relatively high resistance of the composite material to flow of electric current. If the voltage potential created between the strike location and the fastener or fitting exceeds the dielectric of the space between these two locations, electrical arcing will occur. Electrical isolation of metallic fasteners and fittings in accordance with the invention prevents such arcing. Of course, the dielectric strength of the coating on each fastener or fitting must be sufficient to handle the difference in voltage between the location of the strike and the fastener. Such dielectric strength is a function of the thickness of the coating, the material used in forming the coating, and the distance between the strike point and the fastener. In the preferred embodiment of the invention, the conductive enhancement of the outer surface of the skin 2, in combination with the dielectric patches 6, has the effect of reducing the voltage potential between a strike location and metallic fasteners and fittings. However the dielectric strength of the coatings provided on such metallic members is preferably much greater than is required to handle the reduced potential in order to provide the redundancy discussed above.

There are a number of known materials that are suitable for providing the dielectric coating on the metallic fasteners and fittings. Such materials include a spray-on Teflon (trademark) that is subsequently fired, vitrified enamels, sprayed and baked on Kapton (trademark), and fused heat resistant glass or porcelain. The material selection for a particular installation will be governed at least partially by cost limitations and the dielectric and structural strength requirements of the particular installation.

The dielectric coating for providing electrical isolation may be applied to virtually any type of fastener or fitting commonly used in aircraft structures. In the preferred embodiment of the invention, threaded fasteners are provided with a dielectric coating over their head and shank portions but not on their threaded portions. The extent of the dielectric coating on a typical threaded external fastener 8 is illustrated in FIG. 3 by the curved two-headed arrow. The extent of the dielectric coating on a typical threaded internal fastener 14 with a bolt type head is similarly illustrated in FIG. 4. Such coated fasteners 8, 14 in an installation like FIG. 1 would be provided with conventional nuts 12, 18, respectively, and with dielectric or dielectric coated washers 10, 16, respectively. The washers 10, 16 serve as a coating under the nuts 12, 18. If required to obtain the necessary dielectric strength, the protection provided by the washers 10, 16 may be augmented with, for example, 5 millimeter Kapton (trademark) tape.

As noted above, when load requirements permit dielectric fasteners are preferably substituted for metallic dielectric coated fasteners. Such dielectric fasteners may be made from various materials, such as reinforced nylon, the high strength plastic sold under the trademark Torlon 5030, or similar high strength plastics. Preferably, the material chosen for the dielectric fasteners is compatible with manufacture by an injection molding process and/or conventional screw machines. Materials of the type mentioned herein are generally comparable in strength to aluminum rivets or bolts.

FIG. 5 shows a bulkhead fitting 28. Such fittings are used in hydraulic, fuel, and electrical systems which penetrate the structural elements of the aircraft structure, such as the spars, webs, and ribs. In systems constructed according to the invention, bulkhead fittings like the fitting 28 shown in FIG. 5 are treated essentially the same as fasteners. Where strength considerations permit, plastic fittings made from dielectric materials are used. Where the loads on the fittings require greater strength, the fittings are provided with a highly dielectric coating in much the same manner as the fasteners 8, 14 are provided with such a coating.

In FIG. 5, the fitting 28 is shown penetrating a structural wall 36. The fitting 28 includes a head 30 that is integrally mounted on a shaft 38. The shaft 38 extends through the wall 36 and its threaded portion on the side of the wall 36 opposite the head 30 is provided with a washer 32 and a nut 34. The head 30, or at least its side surfaces and its surface adjacent to the wall 36, and the portion of the shaft 38 between the head 30 and the threaded portion of the shaft 38 are provided with a dielectric coating of the same type applied to the fasteners 8, 14. The washer 32 is either made from a dielectric material or provided with a dielectric coating. The nut 34 may be of a conventional type. The dielectric coating serves to isolate the metallic portions of the fitting 28 from the wall 36. This permits fittings such as that shown in FIG. 5 to extend through composite material walls that are conductive continuations of the skin 2 without creating any danger of internal arcing within the structure.

Although the preferred embodiment of the invention has been illustrated and described herein, it is intended to be understood by those skilled in the art that various modifications and omissions in form and detail may be made without departing from the spirit and scope of the present invention as defined in the following claims.

What is claimed is:

1. A method of providing lightning strike protection for an aircraft structure having a composite material external skin that is electrically conductive but less conductive than metals such as aluminum, said method comprising:

enhancing the conductivity of the outer surface of the skin to confine lightning strikes to said outer surface;

covering the outer surfaces of each metal fastener that extends through the skin and a predetermined area of the outer surface of the skin surrounding such fastener with a patch of dielectric material, to prevent such fastener from attracting lightning strikes, to cause lightning strikes to be confined to portions of the outer surface of the skin not covered with a dielectric material, and to cause current flow from a lightning strike to diffuse before reaching such fastener;

dimensioning said area to be sufficiently large to cause such current flow to diffuse, before reaching such fastener, an amount sufficient to lower the current density below a predetermined arcing threshold, to in turn prevent internal arcing in the aircraft structure; and electrically isolating from the skin each metallic fastener and each metallic fitting that substantially contacts the skin or an integral continuation thereof by coating with a dielectric any surface portions of such fasteners and fittings that substantially contact any portion of the skin or any portion of any integral continuation of the skin, to prevent arcing between an external portion of the skin and said fasteners and fittings.

2. A method as recited in claim 1, further comprising fastening other members to said skin and its integral continuations with fasteners made from dielectric materials at locations where the load on fasteners is sufficiently light to be borne by dielectric fasteners.

3. A method as recited in claim 1, in which the step of isolating metallic fasteners includes coating with a dielectric all head and shank portions, but not threaded portions, of metallic fasteners that extend through the skin or any integral continuation of the skin, and providing the coated fasteners with washers having dielectric external surfaces.

4. A method as recited in claim 1, in which the step of enhancing the conductivity of the outer surface of the skin comprises providing the skin with an outer layer including a conductive metal, and cocuring said outer layer with other layers of the skin to integrate said outer layer into the skin.

5. A method as recited in claim 4, in which said outer layer includes nickel coated graphite fibers.

* * * * *

UNITED STATES PATENT AND TRADEMARK OFFICE
CERTIFICATE OF CORRECTION

PATENT NO. : 4,760,493

DATED : July 26, 1988

INVENTOR(S) : Raymond E. Pearson and James H. Covey

It is certified that error appears in the above-identified patent and that said Letters Patent are hereby corrected as shown below:

Cover page, in "[75] Inventor:", following "Redmond", change "," to -- ; James H. Covey, Snohomish, both of --.

Column 1, line 10, "prevent" should be -- prevents --.

Column 1, line 64, "ligthning" should be -- lightning --.

Column 5, line 15, "surfaes" should be -- surfaces --.

Column 6, line 60, "requirement" should be -- requirements --.

Signed and Sealed this

Thirteenth Day of December, 1988

*Attest:*

DONALD J. QUIGG

*Attesting Officer*   *Commissioner of Patents and Trademarks*